(12) United States Patent
Mengual Hinojosa

(10) Patent No.: US 11,964,776 B2
(45) Date of Patent: Apr. 23, 2024

(54) LOCKING SYSTEM, CARGO DECK AND AIRCRAFT

(71) Applicant: TELAIR INTERNATIONAL GMBH, Miesbach (DE)

(72) Inventor: Marcos Mengual Hinojosa, Miesbach (DE)

(73) Assignee: TELAIR INTERNATIONAL GMBH, Miesbach (DE)

( * ) Notice: Subject to any disclaimer, the term of this patent is extended or adjusted under 35 U.S.C. 154(b) by 14 days.

(21) Appl. No.: 17/740,661

(22) Filed: May 10, 2022

(65) Prior Publication Data

US 2022/0363390 A1  Nov. 17, 2022

(30) Foreign Application Priority Data

May 11, 2021  (DE) .......................... 102021112241.4

(51) Int. Cl.
*B64C 1/22* (2006.01)
*B64D 9/00* (2006.01)

(52) U.S. Cl.
CPC ................ *B64D 9/003* (2013.01); *B64C 1/22* (2013.01)

(58) Field of Classification Search
CPC .................................. B64D 9/003; B64C 1/22
See application file for complete search history.

(56) References Cited

U.S. PATENT DOCUMENTS

| 3,693,919 A * | 9/1972 | Alberti .................. B64D 9/003 410/92 |
| 2009/0224101 A1 | 9/2009 | Schettel et al. |
| 2013/0334367 A1* | 12/2013 | Larson ..................... B60P 7/08 244/118.1 |

FOREIGN PATENT DOCUMENTS

| CN | 112298570 A * | 2/2021 | ................ B60P 7/13 |
| DE | 10258439 | 7/2004 | |

\* cited by examiner

*Primary Examiner* — Justin M Benedik
(74) *Attorney, Agent, or Firm* — Barnes & Thornburg LLP

(57) ABSTRACT

A locking system for fixing at least one transport unit for cargo items in an aircraft. The locking system includes a plurality of locking devices and at least one actuating device. Each locking device has at least one locking element for fixing and releasing the transport unit at least one predetermined position and is displaceable in a displacement direction between a fixing position and a release position. The at least one actuating device has at least one actuating unit for initiating an actuating movement and at least one sliding unit for displacing the locking element. The actuating unit is connected to the sliding unit for transmitting the actuating movement by means of at least one transmission section extending transversely to the displacement direction. The sliding unit is mechanically coupled to the locking element to transmit the actuating movement and to move the locking element between the fixing position and the release position.

16 Claims, 2 Drawing Sheets

LOCKING SYSTEM, CARGO DECK AND AIRCRAFT

CROSS REFERENCE TO RELATED APPLICATIONS

This application claims priority to German Patent Application No. 102021112241.4, filed May 11, 2022. The disclosure set forth in the referenced application is incorporated herein by reference in its entirety.

FIELD OF THE DISCLOSURE

The invention relates to a locking system for fixing a cargo transport unit, a cargo deck including such a locking system, and an aircraft.

BACKGROUND

When transporting cargo in aircraft, cargo items such as containers or pallets ("unit load devices—ULDs") are often used, which are cuboid or trapezoidal or have a shape with a special outer contour. Such containers or pallets can be loaded longitudinally or transversely, depending on the aircraft's cargo space. Special pallets, so-called "heavy-duty pallets", can be used to transport particularly heavy cargo. These special pallets have standardized dimensions of 243.8 cm×497.8 cm (96 inches×196 inches) or 243.8 cm×605.8 cm (96 inches×238.5 inches). Such pallets can hold loads weighing up to 13608 kg.

It is generally known that the aforementioned special pallets have a plurality of pockets or recesses at their edges to allow the engagement of side locks for securing the pallets. In order to secure such large pallets in the cargo hold, locks are conventionally provided which are folded up at the front and rear of the pallets in the X direction of the aircraft (longitudinal direction). These locks secure the pallets in the X direction and in the Z direction (vertical direction) of the aircraft.

To achieve the necessary redundancy for securing the pallets in the X and Z directions, side locks are used, which are arranged longitudinally along the inside of the aircraft in the cargo hold. The side locks are used to secure the pallets laterally by engaging the side locks in the pockets or recesses of the pallets. So-called center locks are often arranged in the center of the cargo hold to additionally fix the pallets in the Y direction, which extends transverse to the X direction, and in the Z direction of the aircraft.

In the prior art, locking systems are known in which the side locks are operated manually, i.e. by hand. For actuation, the operating personnel must approach the respective side lock at its installation position. This can only be carried out if there is sufficient space for the operating personnel between the cargo item, i.e. the loaded pallet with picked-up cargo, and the aircraft inner skin of the cargo compartment. For example, this is the case with wide-body aircraft. In these types of aircraft, double-row loading of the cargo hold with the aforementioned special pallets in combination with the known side locks is possible.

On aircraft with smaller cargo holds, such double-row loading is currently not possible because there is not enough space between the aircraft inner skin of the cargo hold and the pallets for access by the operating personnel. Therefore, such cargo holds are mainly loaded in a single row.

SUMMARY

The invention is therefore based on the object of providing a locking system that enables improved utilization of an aircraft cargo deck and simplifies the securing of cargo items in the aircraft cargo deck. It is further the object of the invention to disclose a cargo deck with such a locking system and an aircraft.

This object is solved with respect to the locking system in accordance with the present disclosure. With regard to the cargo deck and the aircraft, the aforementioned object is solved in accordance with the present disclosure.

Specifically, the object is solved by a locking system for fixing at least one transport unit for cargo items, in particular a cargo pallet, in an aircraft. The locking system comprises a plurality of locking devices each having at least one locking element for fixing and releasing the at least one transport unit at at least one predetermined position. The locking element is displaceable in a displacement direction between a fixing position and a release position. The locking system further comprises at least one actuating device for remote actuation at least one of the locking devices.

The actuating device comprises at least one actuating unit for initiating an actuating movement and at least one sliding unit for displacing the locking element. The actuating unit for transmitting the actuating movement is connected to the sliding unit by at least one transmission section extending transversely to the direction of displacement. The sliding unit is mechanically coupled to the locking element of the locking device in order to transmit the actuating movement and to move the locking element in the direction of displacement between the fixing position and the release position.

idea critical aspect of the present invention is that at least one of the locking devices can be remotely actuated by the actuating unit. Preferably, several of the locking devices, in particular at least two of the locking devices, can be remotely actuated by the actuating unit.

To make this possible, the transmission section is provided, which has an extension transverse to the direction of displacement and connects the actuating unit and the sliding unit to one another. In other words, the transmission section bridges a distance, in particular a distance, between the actuating unit and the sliding unit. The actuating unit is thus spaced apart from the sliding unit by the transmission section transverse to the direction of displacement. The actuating unit and the sliding unit are preferably indirectly connected to one another by at least one transmission element. It is advantageous here that the actuation of at least one of the plurality of locking devices does not take place at its installation or mounting position, but is offset from the locking device transversely to the displacement direction of the locking element. This means that the locking device can be operated remotely.

In the case of a loading configuration of a cargo deck having two cargo transport units, in particular cargo pallets, arranged next to one another in the transverse direction of the aircraft, accessibility for operating personnel to the individual locking devices is therefore not absolutely necessary, in contrast to the prior art, since their actuation via the actuating unit is offset transversely to the direction of displacement of the locking element, in particular offset in position. This has the great advantage that not only cargo decks, in particular main decks, of wide-body aircraft can be loaded in double rows, but also cargo decks of aircraft with a smaller cargo deck cross-section compared to wide-body aircraft. Preferably, this relates to double-row loading of cargo decks with heavy-duty pallets, which typi-cally have basic dimensions of 243.8 cm×497.8 cm (96 inches×196 inches) and 243.8 cm×605.8 cm (96 inches×238.5 inches), respectively. Such heavy-duty pallets can carry loads weighing up to 13608 kg.

The locking system according to the invention thus enables improved utilization of the cargo space or cargo deck of aircraft, regardless of the type of aircraft or the size of the cargo deck. Furthermore, the locking system according to the invention simplifies the operation of the locking devices, since several locking elements can be brought into the fixing or release position with a single actuating unit. The transport units, in particular cargo pallets, can therefore be fixed in their transport position in the cargo compartment without great effort. Separate actuation of each locking device of the locking system is not necessary. The loading times of cargo decks are thus considerably reduced.

The locking system according to the invention can be used to fix a single transport unit, in particular a cargo pallet, or several transport units, in particular several cargo pallets, in an aircraft cargo deck simultaneously.

In the locking system, the locking elements of the locking devices can each be moved between the fixing position and the release position. In the fixing position, the respective locking element is in engagement with a transport unit, which can have at least one form-fitting area, in particular a pocket, for this purpose. It is possible for the locking system to have at least one locking element that engages with nothing in the fixing position if no transport unit is arranged at this point.

This can occur, for example, in the case of transport units arranged one behind the other in the longitudinal direction of the aircraft and spaced apart from one another.

In the release position, the respective locking element is not in engagement with the associated transport unit, so that the transport unit is released, in particular laterally. In one embodiment, the locking element can be guided in translational movement in the direction of displacement at least in and/or on a housing. In this embodiment, the fixing position corresponds to a position of the locking element that is at least partially extended from the housing. The release position corresponds to a position of the locking element that is at least partially retracted into the housing.

The actuating unit can be used to introduce the actuating movement for fixing and/or releasing the locking elements from at least one transport unit into the transmission section. The actuating unit can be manually operated, in particular by hand and/or foot, and/or electrically operated, in particular by electric motor, to perform the actuating movement. The actuating movement may be a rotational movement and/or a translational movement. In other words, the actuating unit may be configured to introduce a rotational movement and/or a translational movement into the transmission section. The transmission section is preferably coupled to the actuating unit in such a way that it is set into a translational movement by the actuating movement.

Alternatively, the transmission section can be set in rotation by the actuating unit.

The sliding unit is connected to the transmission section in such a way that it picks up the actuating movement of the actuating unit, which is picked up or translated by the transmission section, and passes it on to the locking element.

For this purpose, the sliding unit is preferably set in rotation by the transmission section. The locking element is mechanically coupled to the sliding unit. The sliding unit can initiate a positioning movement in the locking element via the mechanical coupling to bring it into the fixing or release position. The sliding unit is preferably arranged on the respective locking device. Specifically, the sliding unit is preferably arranged in the immediate vicinity of the locking element.

The respective locking element is preferably of tongue-shaped design. The locking element can be of monolithic design, in particular as a block. In one embodiment, the locking element can be fork-shaped. Other designs of the locking element are possible.

In a preferred embodiment, the actuating unit for remote actuation is provided at a distance from the locking device transverse to the direction of displacement of the at least one locking element. In other words, the actuating unit is offset from the locking device transversely to the direction of displacement of the locking element. Or in other words, the actuating unit has a distance from at least one of the locking devices transverse to the displacement direction. Preferably, the actuating unit is arranged at a distance from a plurality of locking devices transverse to the displacement direction. In this way, one of the locking devices or several locking devices can be remotely actuated by the actuating unit. This has the advantage that the actuating unit, as the central actuating element, is easily accessible to operating personnel for actuation and for servicing. This is particularly advantageous if the actuating unit is to be accessible when the cargo deck is loaded.

In a further preferred embodiment, the actuating unit comprises at least one first rotational element and at least one actuating means by which the first rotational element can be rotated about its rotational axis to initiate an actuating movement.

The first rotational element is preferably connected to the actuating means. The actuating means may be detachably connected to the first rotational element. The first rotational element may be rotated by the actuating means through a predetermined angle of rotation about the rotational axis. The first rotational element may assume at least two rotational positions about the rotational axis by the actuation means. Preferably, the rotational position of the first rotational element pro-vides information about the displacement position of the locking elements.

The rotational axis of the first rotational element can be oriented vertically. The first rotational element can have, at least in sections, toothing in the circumferen-tial direction that engages with the transmission section for initiating an actuating movement. The first rotational element is preferably a first gearwheel.

Alternatively, it is possible for the first rotational element to have an external thread, at least in sections, for introducing the actuating movement into the transmission section. The first rotational element can be mechanically coupled to the transmission section via the external thread. The rotational axis of the first rotational element may be oriented horizontally. The first rotational element and the transmission section may together form, at least in sections, a screw drive and/or a worm drive. In the aforementioned embodiments concerning the first rotational element, it is advantageous that the actuating movement can be transmitted to the transmission section in a simple and precise manner. In addition, this enables a structurally simple design of the locking system.

The actuating means may be a lever. Additionally or alternatively, the actuating means may comprise a crank. The actuating means is preferably arranged at the top of the first rotational element in the installed position, in particular during actuation. Alternatively, the actuating means may be arranged laterally on the first rotational element in the installed position, in particular during actuation. The actuating means may be provided in a removable manner. In other words, the actuating means may be detachably connectable to the first rotational element. The actuating means may be arranged on the first rotational element in a fold-out manner. By means of the actuating means, the first rotational element can be rotated manually, in particular by hand and/or by foot, about its rotational axis. This has the advantage that the operating personnel can quickly and easily manually actuate the locking devices and fix the transport unit or transport units. The com-plexity of the locking system is thus kept low.

Alternatively or additionally, the first rotational element can be rotated electrically about its rotational axis by the actuating means. For this purpose, the actuating means can have at least one electric actuator, in particular an electric motor. This has the advantage that the operating personnel can electrically actuate the locking system and thus the corresponding transport unit(s) via an operating console, thus eliminating the need for manual actuation of the actuating unit. This means that loading and unloading times for the cargo deck can be significantly reduced.

In a preferred embodiment, the sliding unit comprises a second rotational element that is mechanically coupled to the transmission section for transmitting the actuating movement. The second rotational element comprises a rotational axis. The rotational axis of the second rotational element may be oriented vertically. The second rotational element may include circumferentially, at least in a section thereof, a toothing that is in engagement with the transmission section to initiate an actuating movement. Preferably, the second rotational element is a second gearwheel.

Alternatively, it is possible for the second rotational element to have an external thread, at least in sections, for receiving the actuating movement from the transmission section. The second rotational element can be mechanically coupled to the transmission section via the external thread. The rotational axis of the second rotational element may be oriented horizontally. The second rotational element and the transmission section may together form, at least in sections, a screw drive and/or a worm drive. Via the second rotational element, the actuating movement can be picked up by the transmission section in a simple and precise manner. In addition, this further simplifies the structural design of the locking system.

Preferably, the respective locking element has at least one form-fit region with which the second rotational element engages for transferring the locking element into the fixing position and/or into the release position. The second rotational element of the sliding unit is preferably in direct contact with the form-fit region of the locking element. In other words, the locking element preferably interacts directly with the second rotational element via the form-fit region during displacement.

The form-fit region is preferably formed on the locking element. The form-fit region can be at least one toothed section on the locking element that extends in the direction of displacement. Preferably, the second rotational element is arranged adjacent to the locking device. In other words, the second rotational element is located on the locking device for moving the locking element in the displacement direction. Here, it is advantageous that the transmission of the actuating movement takes place via a form-fit region, i.e. mechanically, and thus, for example, electrical means for displacing the locking element can be omitted. The locking system thus has a simplified structure.

The respective locking element can be guided by a housing in the direction of displacement. This can be part of the locking device, i.e. a separate housing part for guiding and supporting the locking element. Alternatively, it is possible for the respective locking element to be displaceably arranged in or on a rail, which extends in particular transversely to the displacement direction. The rail may be a lateral guide rail, which is preferably arranged in the longitudinal direction of the aircraft in the cargo deck. In addition or alternatively, the two rotational elements are each mounted at their positions preferably rotatable about a/the respective rotational axis. The rotational elements can be rotatably mounted on the housing for the locking element and/or on the rail.

The advantage here is that no separate housing is required for the locking element, but the rail can be used as a multi-functional element for guiding and supporting the locking element. In contrast, the separate housing has the advantage that the locking devices can be flexibly positioned on the rail, for example. In addition, the position of the locking elements can be subsequently changed if required.

In a preferred embodiment, the transmission section has an elongated extension and comprises at least one toothed region. The toothed region may be formed in sections. The transmission section may have a single continuous toothed region.

Alternatively, the transmission section may have a plurality of toothed regions.

The toothed region preferably engages at least one of the rotational elements for initiating and/or transmitting the actuating movement. The transmission section is preferably formed by a toothed rack. Here, the transmission section engages with the first and second rotational elements, in particular with the toothing of the first and second rotational elements, via the at least one toothed region.

As a result, when the first rotational element is actuated, its rotational motion is converted into a translational motion of the transmission section and then, at the point of contact between the transmission section and the second rotational element, the translational motion is converted into a rotational motion of the second rotational element. Due to the mechanical coupling of the second rotational element and the locking element, the rotational movement of the second rotational element is converted into a translational movement of the locking element in the direction of displacement. Thus, a mechanically coupled system is present here, which safely transmits the positioning movement of the first rotational element to the locking element(s) in a simple manner. If, for example, at least one of several locking elements cannot properly engage in recesses provided on the transport unit, the first rotational element cannot be completely rotated into an end position.

In one embodiment, the transmission section has at least one threaded region, in particular a threaded spindle. The threaded region can be engaged with at least one of the rotational elements for initiating and/or transmitting the actuating movement. A screw drive may be formed via the threaded region and the engaging rotational element. This may apply to the engagement of the first rotational element as well as the engagement of the second rotational element with the threaded region. The transmission section may have multiple threaded regions or a single continuous threaded region. Preferably, the transmission section extends between at least the first rotational element and at least one second rotational element. In this regard, a separate threaded region may be associated with each rotational element. This embodiment also represents a simple (alternative) way of transmitting the actuating movement from the actuating unit to the locking elements.

In a further embodiment, the transmission section comprises at least one pivoting mechanism that connects the first rotational element and the second rotational element in an articulated manner in such a way that, upon rotation of the first rotational element, the pivoting mechanism performs a pivoting motion and causes the second rotational element to rotate. The pivoting mechanism is preferably formed by a multi-part pivot linkage. The pivoting mechanism may be arranged in a hori-zontal position. The pivot linkage may comprise at least three rod elements, which are connected to each other in an articulated manner. Each of the two rotational elements is connected to one of the rod elements in a rotationally fixed manner.

One of the rod elements preferably connects the other two rod elements, so that when the first rotational element performs a rotational movement (adjusting movement), this is transmitted to the second rotational element. The pivoting mechanism represents a (further alternative) possibility of transmitting the actuating movement from the actuating unit to the locking elements.

Preferably, the actuating unit is directly connected to at least one further locking element of a further locking device for transmitting the actuating movement. In other words, a further locking element of a further locking device can be engaged with the first rotational element for directly receiving the actuating movement.

The further locking element is preferably a locking element of the type described above. In this embodiment, a locking device is arranged on the actuating unit, in particular the first rotational element. This locking device is not connected via the transmission section, but directly to the actuating unit. Here, the actuating unit forms the sliding unit for the further locking element. This has the advantage that a transport unit, for example, can also be secured at the position of the actuating unit. The actuating unit has a dual function.

Further preferably, at least one locking position monitoring device is provided to monitor and/or indicate the position of the locking element in its displacement direction. Particularly preferably, each of the locking devices is equipped with a locking position monitoring device to monitor and/or indicate the position of each locking element. Additionally or alternatively, the actuating unit can be equipped with a locking position monitoring device so that it is possible to see in which position the locking elements are when the actuating unit is actuated. In this way, it can be easily and quickly checked whether the locking elements are properly fixing the transport unit(s), i.e. whether they are completely in the fixing position, or whether there is a malfunction. The correct release of the transport unit(s) can also be checked.

The locking position monitoring device preferably has at least one display element with at least one colored area that indicates the fixing position of the locking element. Preferably, each locking device is provided with such a display element. It is possible that the locking device and/or the sliding unit and/or the adjusting unit have at least one colored display element or themselves comprise a colored area indicating the position of the locking elements. This has the advantage that the position of the locking elements or the proper locking of the transport unit(s) can be recognized visually and thus quickly by the operating personnel.

In a preferred embodiment, the locking position monitoring device comprises at least one magnetic switch. In this case, the magnetic switch closes a circuit in the fixing position of the locking element and thus generates an electrical signal. In the release position, the magnetic switch is open and thus the electric circuit is in-terrupted. The magnetic switch can be a reed switch, in particular a reed contact.

Preferably, each locking device has at least one magnetic switch for locking position monitoring. The electrical signal can be displayed on a control panel for the operating personnel, so that it can be seen, for example, whether the respective locking element is in the fixing position.

In a further embodiment, the locking position monitoring device comprises at least one electrical signal means, in particular a light and/or a signal tone generator, which can be activated or is activated by an/the electrical signal. The electrical signal means can be activated by the electrical signal. This additionally simplifies checking of the correct fixing of the transport unit(s) by the locking elements.

In order to ensure that the locking element or elements remain in their fixing position in the event of a malfunction, the respective locking device has at least one spring device. The spring device holds the locking element in its fixing position in the event of a malfunction. A malfunction can be, for example, a power failure and/or an undesired actuation of the actuating unit and/or generally a failure of the actuating device. In general, the malfunction relates to an undesired displacement of at least one of the locking elements from the fixing position towards the release position in such a way that the transport unit is unsecured at this point.

This is to be avoided in particular during flight operations. The spring device may comprise at least one spring element. The spring element may be a helical spring or a disc spring. Preferably, the spring device comprises at least one spring assembly that has at least one spring element, preferably several spring elements.

According to an alternative independent aspect, the invention relates to a cargo deck of an aircraft having at least one locking system according to the invention, wherein a plurality of locking elements are arranged spaced from one another along at least one rail extending in the longitudinal direction of the aircraft. A sliding unit is associated with each locking element. The actuating unit is mechanically coupled by the transmission section to the sliding units for transmitting the actuating movement to the locking elements.

In use, therefore, several locking devices are arranged along a longitudinal side of a cargo hold of an aircraft. The locking devices are fastened to a rail extending in the longitudinal direction of the aircraft (X direction of the aircraft), in particular a lateral guide rail. The locking elements of the locking devices are preferably displaceable transversely to the longitudinal direction of the aircraft (Y direction of the aircraft) between the fixing position and the release position. The transmission section here extends in the longitudinal direction of the aircraft from the actuating unit to the sliding unit, which, when the actuating unit is actuated, displaces the locking element in the displacement direction, i.e. transversely to the longitudinal direction of the aircraft. Each locking element is assigned a separate sliding unit which is connected to the actuating unit via the transmission section to accommo-date an actuating movement.

According to a further alternative independent aspect, the invention relates to an aircraft having at least one locking system according to the invention and/or a cargo deck of the aforementioned type.

Regarding the advantages of the cargo deck as well as the aircraft, reference is made to the advantages explained in connection with the locking system. Furthermore, the cargo deck and the aircraft can alternatively or additionally have individual or a combination of several features mentioned above in relation to the locking system.

BRIEF DESCRIPTION OF THE DRAWINGS

The invention is explained in more detail below with reference to the accompanying drawings. The embodiments shown represent examples of how the locking system according to the invention can be designed.

The drawings show as follows.

In the following description, the same reference numbers are used for identical parts and parts with the same effect.

DETAILED DESCRIPTION

Figure 1:
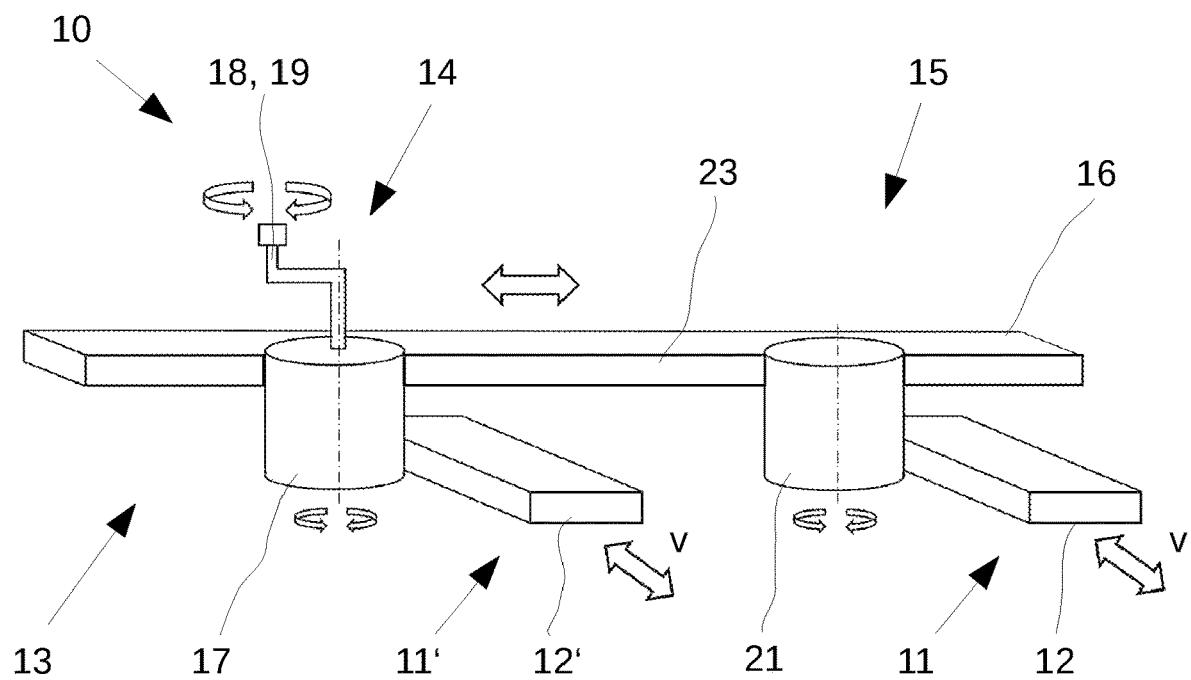
FIG. 1 shows a schematic representation of a locking system according to a first exemplary embodiment according to the invention.
Figure 3:
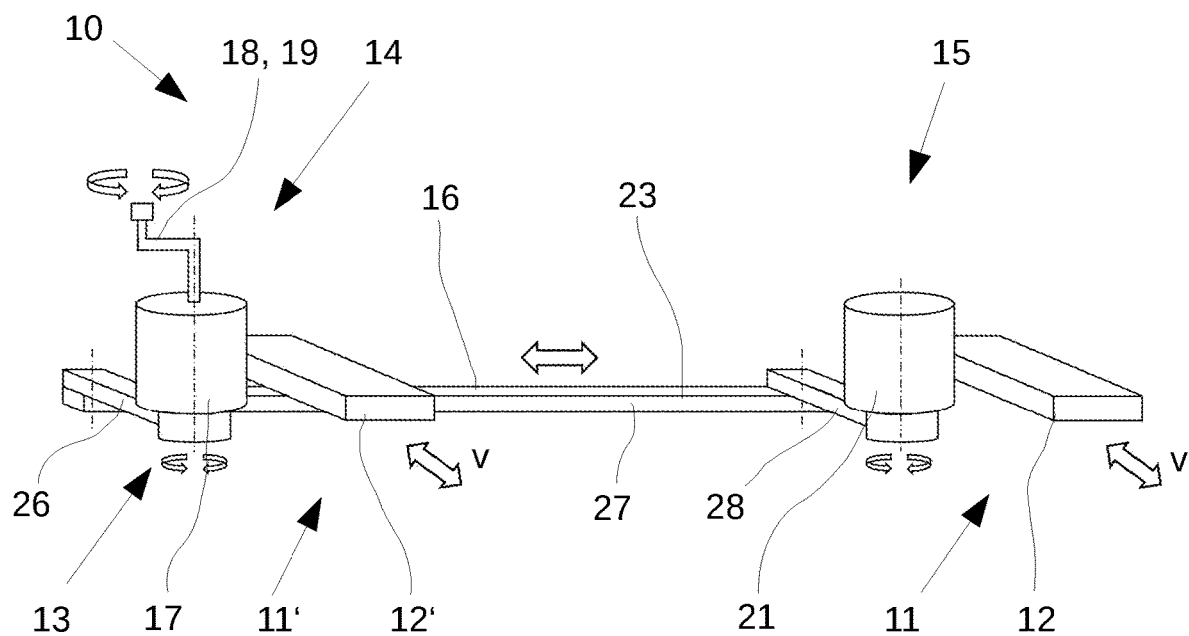
FIG. 3 shows a schematic representation of a locking system according to a second exemplary embodiment according to the invention.

FIGS. 1 and 3 show a schematic representation of a locking system 10 according to a respective exemplary embodiment according to the invention. The locking system 10 is used in cargo decks of aircraft.

Usually, a Cartesian coordinate system is used to provide individual directional information within an aircraft. Here, the X-axis extends from the tail to the nose, the Y-axis extends transverse to the X-axis and lies essentially in the plane spanned by the wings. The Z-axis is perpendicular to the X- and Y-axes.

Specifically, the locking system 10 is used to secure one or more transport units. A transport unit is preferably a cargo pallet, in particular a heavy-duty pallet. Other transport units are possible. In the following, the transport unit is generally referred to as a cargo pallet.

The locking system 10 comprises a plurality of locking devices 11, each having at least one locking element 12, wherein only one of the plurality of locking devices 11 is shown by way of example in FIG. 1 and FIG. 3. The locking system 10 further comprises a further locking device 11' with a further locking element 12'. The locking elements 12, 12' are formed in a tongue shape. More specifically, the locking elements 12, 12' have a monolithic, in particular block-like, shape. Other shapes of the locking elements 12, 12' are possible.

The locking elements 12, 12' serve to fix and release at least one cargo pallet at a predetermined position in a cargo deck. The locking elements 12, 12' can be moved in a displacement direction v between a fixing position and a release position.

In the fixing position, the locking elements 12, 12' fix the cargo pallet opposite the respective locking element in its position. The locking elements 12, 12' preferably engage in recesses, in particular pockets, in the cargo pallet and secure it in the X and Z directions of the aircraft. In the release position, the locking elements 12, 12' are released from the opposite cargo pallet. In other words, the locking elements 12, 12' release the cargo pallet in the release position.

As shown by the double arrows in FIGS. 1 and 3, the locking elements 12, 12' are moved in the direction of displacement between the release position and the fixing position for fixing and releasing. This movement corresponds to a translational movement.

For actuating the locking devices 11, 11', the respective locking system 10 according to FIGS. 1 and 3 has an actuating device 13. The actuating device 13 has an actuating unit 14, a separate sliding unit 15 for each locking element 11, and a transmission section 16. The actuating unit 14 serves to introduce an actuating movement into the transmission section 16. The transmission section 16 serves to receive the actuating movement of the actuating unit 14 and to transmit the received actuating movement to the respective sliding unit 15. The sliding unit 15 is designed to receive the actuating movement from the transmission section 16 and to transmit it to the locking element 12.

The actuating unit 14 is thus connected by the transmission section 16 to the sliding units 15 for transmitting an actuating movement for the locking elements 11. The transmission section 16 extends transversely to the displacement direction v of the locking elements 12, 12'. Through the transmission section 16, the actuating unit 14 and the sliding units 15 are mechanically coupled to each other.

In addition, the sliding units 15 are mechanically coupled to the respective associated locking element 12.

According to FIGS. 1 and 3, the actuating unit 14 is offset from the locking devices 11 transverse to the direction of displacement. In other words, the actuating unit 14 is at a distance from the locking devices 11 transverse to the direction of displacement. Due to this offset and the transmission unit, the locking devices 11 can be remotely actuated via the actuating unit 14.

In the exemplary embodiments according to FIG. 1 as well as FIG. 3, the actuating unit 14 comprises an actuating means 18 and a first rotational element 17 rotatable by the actuating means 18. By means of the actuating element 18, the first rotational element 17 is preferably adjustable between two rotational positions. These rotational positions correspond to the release or fixing position of the locking elements 12, 12'. If the first rotational element 17 cannot be completely transferred in one of the two rotational positions when fixing the cargo pallets, this is an indication that at least one of the locking elements 12, 12' does not properly engage in a recess of the pallets.

The actuating means 18 is designed as a crank 19, by means of which the first rotational element 17 can be rotated about its rotational axis. Alternatively, the actuating means 18 can be a lever and/or an electric drive. In the installed position, the crank 19 is arranged at the top of the first rotational element 17.

Preferably, the crank 19 is detachably connected to the first rotational element 17.

Alternatively, the crank 19 may be arranged on the first rotational element 17 in a fixed, in particular stationary, manner. More specifically, the crank may be arranged on the first rotational element via a detachable plug-in connection. The crank 19 may thus be removable.

The respective sliding unit 15 has a second rotational element 21 with a central rotational axis. The second rotational element 21 is rotatable about its rotational axis. The second rotational element 21 is in contact with the locking element 12.

The second rotational element 21 is arranged on the locking element 12.

The first and second rotational elements 17, 21 are each designed as a gearwheel.

Figure 2:
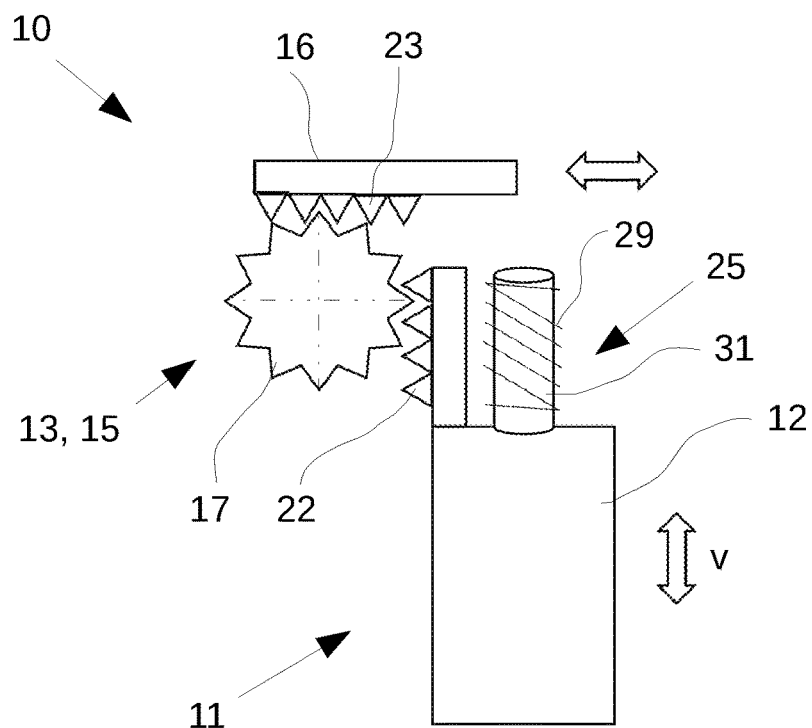
FIG. 2 shows a schematic representation of a mechanical coupling between a locking device and a transmission section of the locking system according to FIG. 1.
Figure 4:
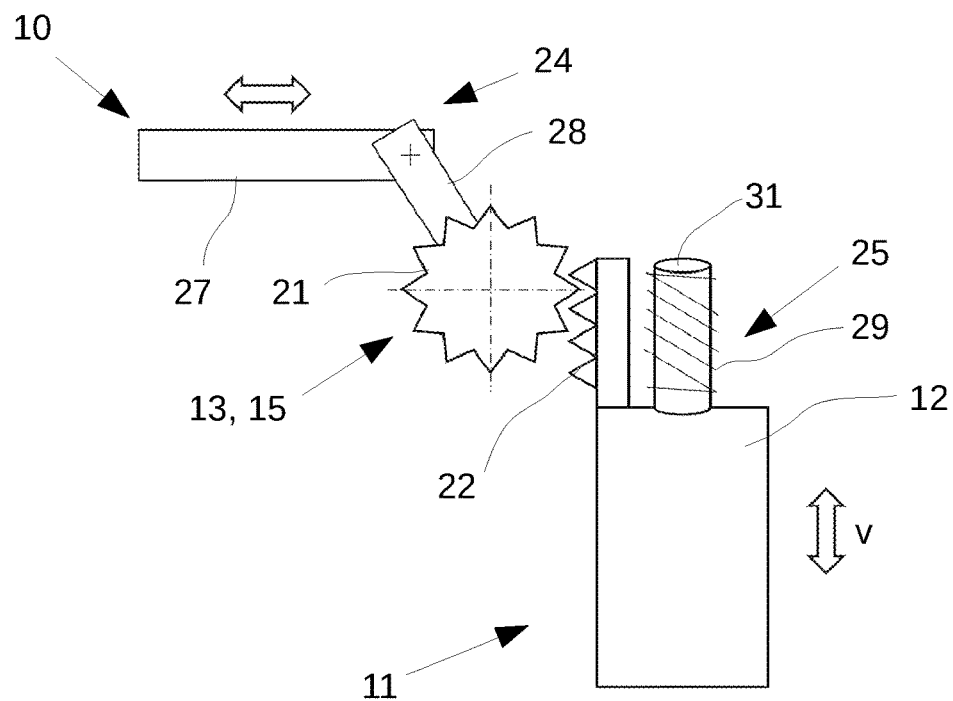
FIG. 4 shows a schematic representation of a mechanical coupling between a locking device and a transmission section of the locking system according to FIG. 3.

The rotational axes of the rotational elements 17, 21 are aligned in the Z direction, i.e. vertically, in the installed position. In other words, the rotational elements 17, 21 are arranged in such a way that the toothing is located laterally on the outer circumference. The rotational elements 17, 21 are thus arranged upright. In FIGS. 2 and 4, a second rotational element 21 with external toothing is shown in each case.

In the locking system 10 according to FIG. 1, the transmission section 16 is formed with a toothed region 23. Here, the transmission section 16 is a toothed rack, with the toothed area of the toothed rack facing the rotational elements 17, 21. The gearwheels 17, 21 are engaged with the toothed region 23 of the rack. The rotational movement of the first rotational element 17 is introduced into the transmission section 16 via the toothed area 23. As a result, the transmission section 16 or the toothed rack is set into a translational movement transverse to the direction of displacement of the locking elements 12. Due to the mechanical coupling of the second rotational elements 21, the translational movement of the rack is converted into a rotational movement of the second rotational elements 21.

Since the second rotational elements 21 are each mechanically connected to one of the locking elements 12, the rotational movement of the second rotational elements 21 is transmitted to the locking elements 12.

In contrast to the locking system 10 according to FIG. 1, the locking system 10 according to FIG. 3 has a transmission section 16 having a pivoting mechanism 24.

Specifically, FIG. 3 shows a pivot linkage having a plurality of rod elements 26, 27, 28. The rod elements 26, 27, 28 are connected to each other in an articulated manner. A first rod element 26 is connected in a rotationally fixed manner at a first end 26' to the first rotational element 17. The first rod element 26 extends angularly away from the first rotational element 17. With a second end 26", the first rod element 26 is connected in an articulated manner to a second rod element 27. The second rod element 27 extends transversely to the direction of displacement at least as far as the third rod element 28. Preferably, a plurality of locking devices 11 (not shown) are provided, each of which is assigned a third rod element 28. The same applies to the sliding units 15 or the second rotational elements 21, which are also provided for each locking device 11.

The respective third rod element 28 is connected in an articulated manner at a first end 28' to the second rod element 27. With a second end 28", the third rod element 28 is connected to the second rotational element 21 in a rotationally fixed manner in order to convert the pivoting movement of the pivot linkage into a rotational movement of the second rotational element 21. This connection can be seen, for example, in FIG. 4. The pivoting movement of the linkage results from the rotation of the first rotational element 17. In this process, the first rod element 26 rotates about the rotational axis of the first rotational element 17 and pivots the second rod element 27. Due to the articulated connection of the third rod element 28 to the second rod element 27 and the rotationally fixed connection of the third rod element 28 to the second rotational element 21, the second rotational element is rotated about its own rotational axis during pivoting. Since the second rotational element 21 is mechanically coupled to the locking element 12, the rotational movement of the second rotational element 21 is transmitted to the locking element 12.

The respective locking element 12 has a form-fit region 22 formed by a toothing.

The second rotational elements 21 are in toothed engagement with the respective locking element 12. The rotational movement of the second rotational element 21 is converted into a translational movement of the locking element 12 by this mechanical connection. The actuating movement of the first rotational element 17 is thus transmitted to the locking elements 12 via the rack and the second rotational elements 21. The further locking element 12' described above, on the other hand, picks up the rotational movement of the first rotational element 17 directly. For this purpose, the further locking element 12' is in direct contact with the first rotational element 17, in particular in meshing engagement.

Like the locking element 12, the further locking element 12' has the form-fit region 22. With regard to the mechanical coupling between the first rotational element 17 and the further locking element 12' for translating the rotational movement into a translational movement of the further locking element 12', reference is made to the above description with regard to the coupling between the second rotational elements 21 and the locking elements 12.

The locking elements 12, 12' according to FIG. 1 and FIG. 3 comprise a spring device 25, which has at least one spring element 29. In FIGS. 2 and 4, it can be seen that the spring element 29 is arranged on a rear side of the respective locking element 12, 12'. For guiding and holding the spring element 29, the locking device 11, 11' has an extension 31 onto which the spring element 29 is pushed. The spring element 29 may be a helical spring. The spring element 29 may be formed by a spring assembly. The spring element 29 is supported, for example, on a housing not shown or on an abutment in order to pretension the locking element 12, 12' in the direction of displacement towards the fixing position. In the event of a malfunction, this prevents the locking element 12, 12' from becoming inadmissibly detached from the cargo pallet to be fixed.

In order to monitor whether the locking elements 12, 12' for fixing the cargo pallets are in the fixing position, a locking position monitoring device is preferably provided. This can have a display element having at least one colored area which indicates the fixing position of the locking element 12, 12'. Alternatively or additionally, the locking position monitoring device may comprise at least one magnetic switch, wherein in the fixing position of the locking element 12, 12' the magnetic switch closes a circuit and generates an electrical signal. The locking position monitoring device can comprise at least one electrical signal means, in particular a light and/or a signal tone generator, which is activated by the generated electrical signal.

At this point, it should be noted that, particularly with reference to the details shown in the drawings, features described in the context of separate embodiments can also be implemented in combination in a single embodiment. Conversely, various features that are described in the context of a single embodiment can also be implemented in multiple embodiments separately or in any suitable subcombination.

LIST OF REFERENCE SIGNS

10 Locking system
11 Locking device
11' Further locking device
12 Locking element
12' Further locking element
13 Actuating device
14 Actuating unit
15 Sliding unit
16 Transmission section
17 First rotational element
18 Actuating means
19 Crank 21 Second rotational element
22 Form-fit region
23 Toothed region
24 Pivoting mechanism
25 Spring device
26 First rod element
26' First end of the first rod element
26" Second end of the first rod element
27 Second rod element
28 Third rod element
28' First end of the third rod element
28" Second end of the third rod element
29 Spring element
31 Extension
V Displacement direction

The invention claimed is:

1. A locking system for fixing at least one transport unit for cargo items in an aircraft, the locking system comprising:
 a plurality of locking devices each having at least one locking element for fixing and releasing the transport unit at at least one predetermined position, wherein the locking element is displaceable in a displacement direction between a fixing position and a release position; and
 at least one actuating device for remote actuation of at least one of the locking devices, wherein the actuating device has at least one actuating unit for initiating an actuating movement and at least one sliding unit for displacing the locking element, wherein the actuating unit is connected to the sliding unit for transmitting the actuating movement by means of at least one transmission section extending transversely to the displacement direction,
 wherein the sliding unit is mechanically coupled to the locking element of the locking device in order to transmit the actuating movement and to move the locking element in the displacement direction between the fixing position and the release position, wherein the locking element has at least one form-fit region formed by a toothing, and wherein the sliding unit includes a rotational element in toothed engagement with the locking element for transferring the locking element into the fixing position and/or into the release position.

2. The locking system according to claim 1, wherein the actuating unit for remote actuation is spaced from the locking device transversely to the displacement direction of the at least one locking element.

3. The locking system according to claim 1, wherein the rotational element is a second rotational element, and wherein the actuating unit comprises at least one first rotational element, and at least one actuating means by which the first rotational element is rotatable about its rotational axis for initiating the actuating movement.

4. The locking system according to claim 3, wherein the actuating means comprises a lever and/or a crank and/or an electric actuator.

5. The locking system according to claim 3, wherein the second rotational element of the sliding unit is mechanically coupled to the transmission section for transmitting the actuating movement.

6. The locking system according to claim 5, wherein the second rotational element engages with the at least one form-fit region of the locking element for transferring the locking element into the fixing position and/or into the release position.

7. The locking system according to claim 6, wherein the transmission section has an elongated extension and comprises at least one toothed region and/or at least one threaded region which engages with at least one of the rotational elements for initiating and/or transmitting the actuating movement.

8. The locking system according to claim 7, wherein the transmission section comprises at least one pivoting mechanism which connects the first rotational element and the second rotational element in an articulated manner in such a way that, upon rotation of the first rotational element, the pivoting mechanism performs a pivoting movement and sets the second rotational element in rotation.

9. The locking system according to claim 1, wherein the actuating unit is directly connected to at least one further locking element of a further locking device for transmitting the actuating movement.

10. The locking system according to claim 1, wherein at least one locking position monitoring device is provided which monitors and/or indicates the position of the locking element in the displacement direction.

11. The locking system according to claim 10, wherein the locking position monitoring device comprises at least one display element having at least one colored area indicating the fixing position of the locking element.

12. The locking system according to claim 11, wherein the locking position monitoring device comprises at least one magnetic switch, wherein in the fixing position of the locking element the magnetic switch closes a circuit and generates an electrical signal.

13. The locking system according to claim 10, wherein the locking position monitoring device comprises at least one electrical signal means which can be activated or is activated by an electrical signal.

14. The locking system according to claim 1, wherein the locking device has at least one spring device which fixes the locking element in the fixing position in the event of a malfunction.

15. A cargo deck of an aircraft having at least one locking system according to claim 1, wherein a plurality of locking devices are arranged spaced from one another along at least one rail extending in a longitudinal direction of the aircraft, wherein a sliding unit is associated with each locking element and the actuating unit is mechanically coupled by the transmission section to the sliding units for transmitting the actuating movement to the locking elements.

16. An aircraft having at least one cargo deck according to claim 15.

* * * * *